Patented Sept. 25, 1951

2,568,740

UNITED STATES PATENT OFFICE 2,568,740

DEMULSIFYING COMPOSITIONS

Willard H. Kirkpatrick, Sugar Land, Tex., and Doyne L. Wilson, Pasadena, Calif., assignors to Visco Products Company, Houston, Tex., a corporation of Delaware No Drawing. Application March 16, 1948, Serial No. 15,278

10 Claims. (Cl. 252—341)

This invention relates to the art of resolving petroleum emulsions, more particularly petroleum emulsions of the oil-in-water type, encountered, for example, in the production, handling and refining of petroleum. These oil-in-water emulsions, or so-called reversed emulsions, occur frequently in the Flower's Bluff, Freer, and Seven Sisters pools of Southwestern Texas, and are occasionally encountered in other oil producing areas such as California.

One of the objects of this invention is to provide a new and improved process for separating petroleum emulsions into their component parts, i. e., oil and water.

A further object is to provide novel, water wettable, interfacial and surface active products or compositions adapted for use as demulsifiers, or for other uses where water wettable properties or characteristics are desirable.

A still further object of the invention is to provide a process for the resolution of emulsions encountered outside oil fields, as, for example, water in the hold of a ship contaminated with oil. In such cases clarification of the water prior to disposal in a harbor or bay area may be effected by the methods herein described. Likewise, the compositions of the present invention may be employed in various other cases where separation of emulsions into their components is desired.

Further objects will appear from the following description in which the reagents and the processes for their employment relate to the treatment of petroleum emulsions.

Oil field emulsions, for the most part, are of the water-in-oil type. The oil-in-water or reversed emulsions to which the present invention is particularly directed, are frequently encountered, however, in the areas noted above. A reversed emulsion, as encountered in the oil fields, contains a small amount of oil, usually less than one per cent, as the disperse phase, and its presence is denoted by the milky tinge which it imparts to the water, usually low in salt content. In the aforementioned areas, both types of emulsions are produced together; that is, the water which is the disperse phase in the normal water-in-oil emulsion is, in itself, an oil-in-water emulsion. Ordinary demulsifiers which resolve water-in-oil emulsions, have little or no effect on oil-in-water type emulsions. These latter emulsions have heretofore proven difficult to resolve and the recovery of the oil contained therein, which often means the difference between a successful and unsuccessful operation, has presented many problems.

We had discovered that petroleum emulsions, and particularly the reversed oil-in-water emulsions, may be readily and quickly resolved into their component parts by the use of any one, or a combination, of the chemical compositions disclosed herein. Further, our investigations show that after treatment the water discharged from the gun barrel and settling tanks has excellent clarity, and that the recovered oil is homogenous. However, when the reagent selected for use contains inorganic electrolytes such as calcium chloride and/or zinc chloride together with or without protective colloids some flocculent material may result from the treatment. In some instances it has been found to be preferable to treat a mixture containing both types of emulsions by a single fluid containing a composition of the present invention and an additional substance adapted to resolve the normal water-in-oil emulsion, where the chemicals for the different emulsions are compatible.

The present invention is more particularly concerned with oil-in-water demulsifying or resolving compositions containing one or more hydrophilic colloids, as, for example, animal glue, dextrins, and the like. In general, oil-in-water emulsions cannot be resolved completely by a hydrophilic colloid but the presence of a hydrophilic colloid such as glue enhances the capacity of a given demulsifying agent for resolving oil-in-water emulsions. Undoubtedly, the hydrophilic colloid assists in some unknown manner in carrying the active principle of the resolving reagent to the interface of the oil and water phases of the emulsion and likewise assists in replacing the emulsifier which is adsorbed at the interface by the resolving reagent component.

According to this invention, it has been found that the addition of a gel liquefying agent, e.g., urea and closely related chemical compounds, to petroleum emulsion breaking compositions containing a hydrophilic colloid permits an increased concentration of the hydrophilic colloid in an emulsion resolving reagent and produces improved results in resolving oil-in-water emulsions. We have found and demonstrated in many instances that the increased concentration of the hydrophilic colloid made possible by the addition of a gel liquefying agent results in a more effective resolution of the oil-in-water emulsion.

The invention overcomes a practical difficulty which arises in the use of a gellable hydrophilic colloid such as glue, dextrin and the like in that compositions containing these materials gel when the colloid is present even in relatively low concentrations. Furthermore, the point of gelation bears a direct relationship to the temperature of the material under consideration. In actual field and plant usage these resolving compositions are injected into the emulsion by means of a chemical proportioning pump which operates 24 hours a day without benefit of protection from atmospheric conditions. Thus, oftimes the emulsion resolving composition can be metered satisfactorily during the daylight hours but with the cooler temperatures prevailing during night operations the composition gels and prevents the pump from injecting the proper amount of chemical into the emulsion stream. We have discovered that the use of a weight ratio from 0.5:1 to 4:1 of urea to the hydrophilic colloid permits the concentration of a hydrophilic colloid such as glue to be increased as much as 100% without lowering the gelation point of the resulting composition. We preferably employ a ratio of 0.5:1 to 2:1. Likewise, we have found that gel liquefying agents such as urea, together with a hydrophilic colloid, can be used satisfactorily in conjunction with inorganic type demulsifying agents, as well as organic demulsifying agents.

Inorganic electrolytes were one of the earliest class of reagents suggested for resolving oil-in-water, or so-called reversed emulsions. As early as 1921, Bhotnagar in J. Chem. Soc., 119, 1760, published a valuable paper on the reversal of emulsion type by electrolytes. The resolution of an oil-in-water emulsion is the first stage in the reversal or inversion of such an emulsion type. This work, as well as later investigations, have quite definitely established that the resolution of an oil-in-water emulsion is a function of the valency of the inorganic cation of the inorganic electrolytes. Additionally, the solubility of the electrolytes has a distinct effect on the efficiency of the electrolytes. From a practical standpoint, the chlorides of zinc and/or calcium have been found to give the most satisfactory results. The use of zinc chloride sometimes causes difficulty due to the ease of hydrolysis results in a formation of flocculent zinc hydroxide.

Any of the organic oil-in-water emulsion breaking chemicals (herein called demulsifier chemicals) may be employed as the essential demulsifier component of the compositions prepared in accordance with the invention. Special mention may be made of the reaction products of alkylolmonoamines (e. g., triethanolamine, diethanolamine, monoethanolamine, the corresponding propanolamines, and higher homologues) with saturated or unsaturated detergent forming acids and their esters (e. g., ricinoleic acid, castor oil, linoleic acid, lauric acid, linseed oil, soya bean oil and other fatty bodies) possessing an acidic function and containing at least 8 carbon atoms in a hydrocarbon structure; the reaction products of polyamines (e. g., diethylene triamine) with such fatty bodies; the reaction products of alkylol polyamines (e. g., hydroxy ethylethylene diamine) with such fatty bodies; the reaction products of polymerized alkylolamines (e. g., triethanolamine, or hydroxy ethylethylene diamine) with such fatty bodies; polymerized alkylolamines (e. g., polymerized triethanolamine made by heating triethanolamine as described by Monson U. S. Patent No. 2,407,895); and complex reaction products made by heating alkylolamines with salts of amphoteric metals (e. g., the product obtained by heating triethanolamine and zinc chloride with the elimination of an aqueous distillate). The various demulsifiers previously described are preferably acidified to increase their water solubility before they are incorporated with the other ingredients of the composition.

The following examples illustrate the use of a hydrophilic colloid and a gel liquefying composition in conjunction with the demulsifying compositions referred to above. In these examples the quantities are stated in parts by weight unless otherwise indicated.

Example I

In 26 parts of water there was dissolved 75 parts of technical calcium chloride and 65 parts of technical zinc chloride. In a separate vessel 20 parts of animal glue was dissolved in 100 parts of water at 180 degrees F., to which was added 40 parts of crystal urea. The concentrated salt solution was then added gradually to the glue solution with stirring at 180 degrees F. to yield the completed product.

Example II

Commercial triethanolamine was molecularly dehydrated by heating at elevated temperatures of approximately 250 degrees C. until about 20% of the original weight had been secured as an aqueous distillate. This modified alkylolamine was then condensed with castor oil in a ratio of approximately 1 part of triethanolamine to 2.6 parts of castor oil at 185 degrees C. to 256 degrees C. for 6 hours in the presence of $SO_2$ extract (about 40% of triethanolamine) with the loss of an aqueous distillate to yield a sub-resinous water dispersible colloid. To 100 parts of this colloid there was added 60 parts of isopropanol and 14 parts of muriatic acid at 75 degrees F. to yield a clear solution. In a separate vessel 20 parts of glue was dissolved in 100 parts of water at 180 degrees F. When solution was effected 65 parts of urea and 30 parts of water were added. The glue solution was added to the solution of the sub-resinous colloid with stirring to yield the completed product.

Example III

The procedure of Example II was repeated, replacing glue with gelatin.

Example IV

The procedure of Example II was repeated, replacing glue with dextrin.

Example V

The procedure of Example II was repeated, replacing glue with gum arabic.

Example VI

The procedure of Example II was repeated, replacing the urea with monomethyl urea.

Example VII

The procedure of Example II was repeated, replacing the urea with dicyandiamide.

Example VIII

In a reaction vessel, 5400 parts of castor oil and 1840 parts of aminoethylethanolamine were condensed by heating at 220 degrees C. to 240 degrees C. for 7 hours to yield a sub-resinous colloid.

In a separate vessel, 20 parts of glue was dissolved in 28 parts of water at 180 degrees F. to yield a solution free of gel. Thirty (30) parts of urea, 24 parts of water and 86 parts of the polyamine sub-resinous colloid were added to the glue solution with stirring at 80 degrees F. to yield the finished product.

*Example IX*

In a reaction vessel, 750 parts of triethanolamine and 55 parts of technical zinc chloride were heated at elevated temperatures of 212 degrees C. to 225 degrees C. until 80 parts of an aqueous distillate has been secured from the reaction.

To 350 parts of the above intermediate there was added 75 parts of muriatic acid and a solution of glue previously prepared by dissolving 45 parts of glue and 68 parts of urea in 100 parts of water. The mixture was stirred to yield a homogenous product.

Examples of suitable hydrophilic un-ionized colloids which may be used in conjunction with demulsifying compositions are starches, dextrins, gum arabic, gum tragacanth, gelatin, glue, tannins, water soluble urea-formaldehyde resins and water soluble alkyl cellulose such as methyl cellulose.

Gel liquefying ingredients which may be employed for the purpose of the invention are urea, thiourea, dicyandiamide, water soluble derivatives of urea such as methyl urea, and other water soluble homologues and analogues of urea.

As indicated by the foregoing examples, it is sometimes desirable to incorporate with the demulsifying compositions a solvent which is at least partially soluble in water and in oils (e. g., isopropanol, the monobutyl ether of ethylene glycol, or the monobutyl ether of diethylene glycol).

Each of the compositions described in the examples may be employed in a conventional manner to break reversed emulsions. In the Texas oil fields the composition is usually added to the emulsified oil between the well and a gun barrel. In the California oil fields it is usually added to one or more sumps or pools containing the emulsified oil. In either case the quantity required to break the oil-in-water emulsion is quite small. The optimum quantities for any given reversed emulsion may be determined by making a series of field bottle tests, known in the art as the determination of the "finding ratio." In most cases, effective results can be obtained within the range of one part of emulsion breaking composition (calculated on total solids) per 20,000 to 120,000 parts of emulsion, the amount varying within this range depending upon the effectiveness of the particular demulsifier.

The relative proportions of the demulsifier chemical and the hydrophilic un-ionized colloid may be varied rather widely, any substantial amount of the colloid (even as low as 1%) producing some enhanced effectiveness. In general, however, the preferred ratio is within the range of one part of such colloid to three to nine parts by weight of the demulsifier chemical.

The amount of urea or other gel liquefying agent used should preferably be sufficient to increase the solubility of the hydrophilic colloid in water at ordinary temperatures (e. g., 75 degrees F.). In other words, by adding the gel liquefying agent the concentration of the gellable hydrophilic colloid may be increased without gelation to a point where gelation would ordinarily occur at the temperature of the emulsion breaking composition if no gel liquefying agent were added. Even as much as 5% of the gel liquefying agent by weight of the hydrophilic colloid may have the desired gel inhibiting action on some colloids.

The total quantity of solvent will depend upon the amount required to give a flowable, pumpable liquid of the proper viscosity for use in a chemical proportioning pump.

The use of the invention and the advantage thereof in breaking a particular emulsion will be governed by the nature of the oil-in-water emulsion which it is desired to break. In the Southwest Texas area where the oil is largely naphthenic or naphthenic-asphaltic, the oil-in-water emulsions formed are in general much more stable and more difficult to break than the California emulsions (e. g., Mt. Poso emulsions) where the oil is principally asphaltic. The present invention is especially advantageous in breaking the Southwest Texas emulsions.

Having thus described the invention, what we claim as new and desire to secure by Letters Patent of the United States is:

1. A composition consisting essentially of an oil-in-water demulsifying surface active organic sub-resinous water wettable colloid as one component, a hydrophilic un-ionized colloid as another and different component, water, and a gel liquefying agent for said hydrophilic un-ionized colloid, said un-ionized colloid being present in proportions corresponding to one part of un-ionized colloid to 3 to 9 parts by weight of said demulsifier chemical, and said gel liquefying agent being present in proportions corresponding to a weight ratio to said un-ionized colloid within the range of 0.5:1 to 4:1, the quantity of said gel liquefying agent being sufficient substantially to inhibit gel formation in the hydrophilic un-ionized colloid, and said composition being effective to break an oil-in-water emulsion when added thereto in proportions of one part by weight calculated on total solids per 20,000 to 120,000 parts of said emulsion.

2. A composition consisting essentially of an oil-in-water water wettable surface active organic sub-resinous colloid demulsifier chemical as one component, animal glue as another and different component, water, and urea, the quantity of animal glue to said demulsifier chemical being within the range of one part of animal glue to 3 to 9 parts by weight of the demulsifier chemical, and the quantity of urea being within the range of a weight ratio of urea to animal glue from 0.5:1 to 4:1, the quantity of urea being sufficient to inhibit substantially gel formation by the glue, and said composition being effective to break an oil-in-water emulsion when added thereto in proportions of one part by weight calculated on total solids per 20,000 to 120,000 parts of said emulsion.

3. An oil-in-water demulsifying composition containing as one component a sub-resinous water wettable colloid from the group consisting of: the products of the reaction of (a) a member from the group consisting of saturated and unsaturated detergent forming acids and their esters containing at least 8 carbon atoms in a hydrocarbon structure with (b) a member from the group consisting of alkylolmonoamines, aliphatic polyamines and polymerized alkylolamines; the complex reaction products made by heating alkylolamines with salts of amphoteric metals; the polymerized alkylolamines; and the products derived by acidifying the aforesaid reaction products and polymerized alkylolamines, as another and different component a hydrophilic un-ionized colloid and a gel liquefying agent for said hydrophilic un-ionized colloid, the proportion of hydrophilic un-ionized colloid corresponding to one part of said un-ionized colloid to 3 to 9 parts by weight of said sub-resinous water wettable colloid, the amount of gel liquefying agent corresponding to a weight ratio to said un-ionized colloid within the range of 0.5:1 to 4:1 and being sufficient substantially to inhibit gel formation in the hydrophilic un-ionized colloid, and said composition being effective to break an oil-in-water emulsion when added thereto in proportions of one part by weight calculated on total solids per 20,000 to 120,000 parts of said emulsion.

4. An oil-in-water demulsifying composition consisting essentially of a condensation product of castor oil and aminoethylethanolamine condensed to a surface active organic water wettable sub-resinous colloid, animal glue, urea and water, the quantity of glue corresponding to one part of animal glue to 3 to 9 parts by weight of said sub-resinous colloid, the quantity of urea corresponding to a weight ratio to said animal glue within the range of 0.5:1 to 4:1 and being sufficient substantially to inhibit gel formation by the glue, and said composition being effective to break an oil-in-water emulsion when added thereto in proportions of one part by weight calculated on total solids per 20,000 to 120,000 parts of said emulsion.

5. An oil-in-water demulsifying composition containing as one component a sub-resinous water wettable colloid from the group consisting of: the products of the reaction of (a) a member from the group consisting of saturated and unsaturated detergent forming acids and their esters containing at least 8 carbon atoms in a hydrocarbon structure with (b) a member from the group consisting of alkylolmonoamines, aliphatic polyamines and polymerized alkylolamines; the complex reaction products made by heating alkylolamines with salts of amphoteric metals; the polymerized alkylolamines; and the products derived by acidifying the aforesaid reaction products and polymerized alkylolamines, as another and different component animal glue, and as a third component urea, the proportions of animal glue corresponding to one part of animal glue to 3 to 9 parts by weight of said sub-resinous organic water wettable colloid, the amount of urea corresponding to a weight ratio to said animal glue within the range of 0.5:1 to 4:1 and being sufficient substantially to inhibit gel formation in the animal glue, and said composition being effective to break an oil-in-water emulsion when added thereto in proportions of one part by weight calculated on total solids per 20,000 to 120,000 parts per weight of said emulsion.

6. The process of breaking an oil-in-water petroleum emulsion which comprises treating such emulsion with a demulsifying composition as claimed in claim 1.

7. The process of breaking an oil-in-water petroleum emulsion which comprises treating such emulsion with a demulsifying composition as claimed in claim 2.

8. The process of breaking an oil-in-water petroleum emulsion which comprises treating such emulsion with a demulsifying composition as claimed in claim 3.

9. The process of breaking an oil-in-water petroleum emulsion which comprises treating such emulsion with a demulsifying composition as claimed in claim 5.

10. A method of breaking oil-in-water petroleum emulsions of the type found in Southwestern Texas which comprises treating said emulsions with a composition as claimed in claim 4.

WILLARD H. KIRKPATRICK.
DOYNE L. WILSON.

REFERENCES CITED

The following references are of record in the file of this patent:

UNITED STATES PATENTS

| Number | Name | Date |
|---|---|---|
| 1,938,574 | Bauer | Dec. 12, 1933 |
| 1,950,483 | Christopher et al. | Mar. 13, 1934 |
| 2,159,313 | Blair et al. | May 23, 1939 |
| 2,192,218 | Bosland | Mar. 5, 1940 |
| 2,407,895 | Monson et al. | Sept. 17, 1946 |
| 2,427,326 | Goodloe et al. | Sept. 9, 1947 |